US007900849B2

(12) United States Patent
Barton et al.

(10) Patent No.: US 7,900,849 B2
(45) Date of Patent: Mar. 8, 2011

(54) HVAC REMOTE CONTROL UNIT AND METHODS OF OPERATION

(75) Inventors: Eric J. Barton, Eden Prairie, MN (US); Kenneth B. Kidder, Coon Rapids, MN (US); Timothy M. Tinsley, Coon Rapids, MN (US); John S. Fultz, Minneapolis, MN (US); Gregory W. Young, Richfield, MN (US)

(73) Assignee: Honeywell International Inc., Morristown, NJ (US)

( * ) Notice: Subject to any disclaimer, the term of this patent is extended or adjusted under 35 U.S.C. 154(b) by 570 days.

(21) Appl. No.: 11/948,966

(22) Filed: Nov. 30, 2007

(65) Prior Publication Data

US 2009/0140059 A1 Jun. 4, 2009

(51) Int. Cl.
G05D 23/00 (2006.01)

(52) U.S. Cl. .......................... 236/51; 165/11.2; 374/120

(58) Field of Classification Search ............... 236/51; 165/11.2, 237; 700/276; 341/176; 340/825.69, 340/825.72, 870.17, 589, 501; 374/120, 374/129, 141
See application file for complete search history.

(56) References Cited

U.S. PATENT DOCUMENTS

| | | | |
|---|---|---|---|
| 4,336,902 A | | 6/1982 | Neal |
| 4,399,823 A | * | 8/1983 | Donnelly ...................... 600/549 |
| 4,433,719 A | | 2/1984 | Cherry et al. |
| 4,585,164 A | | 4/1986 | Butkovich et al. |
| 4,969,508 A | * | 11/1990 | Tate et al. ..................... 165/209 |
| 5,199,637 A | * | 4/1993 | Adams ......................... 236/78 R |
| 5,272,477 A | | 12/1993 | Tashima et al. |
| 5,590,831 A | | 1/1997 | Manson et al. |
| 5,603,451 A | | 2/1997 | Helander et al. |
| 5,654,813 A | | 8/1997 | Whitworth |
| 5,803,915 A | * | 9/1998 | Kremenchugsky et al. .. 600/549 |
| 5,833,134 A | | 11/1998 | Ho et al. |
| 5,839,654 A | | 11/1998 | Weber |
| 6,152,375 A | | 11/2000 | Robison |
| 6,196,467 B1 | | 3/2001 | Dushane et al. |
| 6,260,765 B1 | | 7/2001 | Natale et al. |
| 6,348,856 B1 | * | 2/2002 | Jones et al. .................. 340/10.1 |
| 6,394,359 B1 | | 5/2002 | Morgan |
| 6,460,774 B2 | | 10/2002 | Sumida et al. |
| 6,679,830 B2 | * | 1/2004 | Kolarovic et al. .............. 600/22 |
| 6,810,307 B1 | | 10/2004 | Addy |
| 7,012,535 B2 | * | 3/2006 | Keller .......................... 340/581 |

(Continued)

OTHER PUBLICATIONS

Logitech, "Harmony 880 Remote User Manual," v. 1, pp. 1-15, prior to Nov. 30, 2007.

(Continued)

Primary Examiner — George Nguyen
(74) Attorney, Agent, or Firm — Seager Tufte & Wickhem LLC (57) ABSTRACT

A comfort control system for controlling the comfort level in a building includes a comfort control unit and a remote control unit. The remote control unit communicates with the comfort control unit from a remote location. In one illustrative embodiment, the remote control unit includes a temperature sensor for sensing an ambient air temperature near the remote control unit, and a measure related to the sensed temperature may be communicated to the comfort control unit. A detection block may be included in the remote control unit for detecting when the ambient air temperature sensed by the temperature sensor in the remote control unit is likely to be influenced by a user or other undesirable condition. The comfort control unit may take this into account when controlling the comfort control system of the building.

28 Claims, 8 Drawing Sheets

U.S. PATENT DOCUMENTS

| | | |
|---|---|---|
| 7,083,109 B2 | 8/2006 | Pouchak |
| 7,089,088 B2 | 8/2006 | Terry et al. |
| 7,108,194 B1 | 9/2006 | Hankins, II |
| 7,146,253 B2 | 12/2006 | Hoog et al. |
| 2003/0034897 A1 | 2/2003 | Shamoon et al. |
| 2003/0034898 A1 | 2/2003 | Shamoon et al. |
| 2003/0103075 A1 | 6/2003 | Rosselot |
| 2003/0107552 A1* | 6/2003 | Lu .................................. 345/163 |
| 2003/0230632 A1* | 12/2003 | Morris ............................ 236/47 |
| 2004/0193324 A1 | 9/2004 | Hoog et al. |
| 2005/0083168 A1 | 4/2005 | Breitenbach |
| 2005/0270151 A1 | 12/2005 | Winick |
| 2006/0071086 A1 | 4/2006 | Kates |
| 2006/0074586 A1* | 4/2006 | Kautz et al. ................... 702/130 |
| 2006/0165149 A1* | 7/2006 | Kolk ................................ 374/1 |
| 2006/0186213 A1 | 8/2006 | Carey et al. |
| 2007/0114293 A1 | 5/2007 | Gugenheim |
| 2007/0114295 A1 | 5/2007 | Jenkins |
| 2009/0140059 A1* | 6/2009 | Barton et al. ................... 236/51 |

OTHER PUBLICATIONS

Lux Products Corporation, "9000RF Remote Instructions," 2 pages, prior to Nov. 30, 2007.

OESA Heating Products, "Wireless Hand-Held Remote Control Sets Models (C)GHRCB and (C)GHRCTB, Operating Instructions," 4 pages, May 2003.

OMRON Electronic Components, LLC, "Micro Tilt Sensor D6B," Cat. No. JB301-E3-01, 6 pages, Mar. 2005.

OMRON Electronic Componenets, LLC, "Micro Tilt Sensor D6B," Cat. No. B02WAD1, 2 pages, Jun. 2002.

Sharp Corporation, "GP1S036HEZ Phototransistor Output, Transmissive Photointerrupter with Tilt Direction (4-Direction) Detecting," pp. 1-11, Oct. 3, 2005.

Totaline, "P/N 374-0431 Thermostat Remote Control & Receiver," 11 pages, prior to Nov. 30, 2007.

Trane, "Wireless Zone Sensor," 4 pages, Feb. 2006.

Travis Industries, Inc., "Remote Fireplace Thermostat, Part No. 99300651," pp. 1-6, Feb. 3, 2003.

* cited by examiner

HVAC REMOTE CONTROL UNIT AND METHODS OF OPERATION

FIELD

The present invention relates generally to HVAC controllers for controlling HVAC systems, and more particularly, to HVAC controllers that include a portable remote control unit.

BACKGROUND

Heating, ventilation, and/or air conditioning (HVAC) systems are often used to control the comfort level within a building or other structure. Many HVAC controllers include a controller that activates and deactivates one or more HVAC components of the HVAC system to affect and control one or more environmental conditions within the building. These environmental conditions can include, but are not limited to, temperature, humidity, and/or ventilation. In many cases, the controller of the HVAC controller may include, or have access to, one or more sensors, and may use sensed parameters provided by the one or more sensors to control the one or more HVAC components to achieve one or more programmed or set environmental conditions.

In some cases, the HVAC controller may include a thermostat that is mounted to a wall or the like of the building. A typical thermostat includes a local temperature sensor and/or other sensors, which may be used to sense one or more environmental conditions of the inside space proximate to the thermostat, and/or may have access to one or more remotely mounted sensors that are mounted to a wall or the like in the building at a location remote from the thermostat. In these installations, the sensors are typically mounted at or near the walls of the building, and at particular fixed locations within the building. In many cases, the occupants of the building do not occupy the space immediately adjacent to the sensors, and therefore, the environmental conditions sensed by the sensors may not accurately represent the actual environmental conditions at the location of the occupants. Also, to make a desired change to the environmental condition in the building, the occupant must often walk over and physically interact with the thermostat. In zoned systems, the occupant may have to walk to each zone and interact with a controller in each zone.

SUMMARY

The following summary is provided to facilitate an understanding of some of the innovative features unique to the present invention and is not intended to be a full description. A full appreciation of the invention can be gained by taking the entire specification, claims, drawings, and abstract as a whole.

The present invention relates generally to HVAC controllers for controlling HVAC systems, and more particularly, to HVAC controllers that include a portable remote control unit. In one illustrative embodiment, a remote control unit for use with a comfort control system of a building or other structure is provided. The remote control unit may include a temperature sensor for sensing an ambient temperature at the remote control unit, a wireless interface for wirelessly communicating a measure related to the ambient temperature sensed by the temperature sensor to the comfort control system, and a detection block for detecting when the ambient temperature sensed by the temperature sensor is likely to be influenced by a user. In some cases, the remote control unit may include a control unit for producing the measure that is related to the ambient temperature sensed by the temperature sensor, and for causing the wireless interface to wirelessly communicate the measure related to the ambient temperature sensed by the temperature sensor to the comfort control system.

In some cases, when the detection block detects that the ambient temperature sensed by the temperature sensor is likely to be influenced by a user, the control unit may, for example: cause the wireless interface to wirelessly communicate the measure related to the ambient temperature sensed by the temperature sensor to the comfort control system less often; cause the wireless interface to suspend wirelessly communicating the measure related to the ambient temperature sensed by the temperature sensor to the comfort control system; cause the wireless interface to wirelessly communicating a signal to the comfort control system that indicates that the ambient temperature sensed by the temperature sensor is likely to be influenced by a user; and/or cause any other desired response, if any.

In some cases, the remote control unit may include a user interface, and the detection block may detect that the ambient temperature sensed by the temperature sensor is likely to be influenced by the user when the user interacts with the user interface. For example, the detection block may monitor one or more buttons or the user interface for user interaction. In another case, the detection block may include a motion sensor to detect motion of the remote control unit by the user. In another case, the detection block may include an attitude sensor to detect when the attitude of the remote control unit is an unacceptable attitude. In another example, the detection block may include an outer housing temperature sensor thermally coupled to an outer housing of the remote control unit to sense a temperature change influenced by the user.

BRIEF DESCRIPTION

The invention may be more completely understood in consideration of the following detailed description of various illustrative embodiments of the invention in connection with the accompanying drawings, in which.

DETAILED DESCRIPTION

The following description should be read with reference to the drawings wherein like reference numerals indicate like elements throughout the several views. The detailed description and drawings show several embodiments which are meant to be illustrative of the claimed invention.

Figure 1:
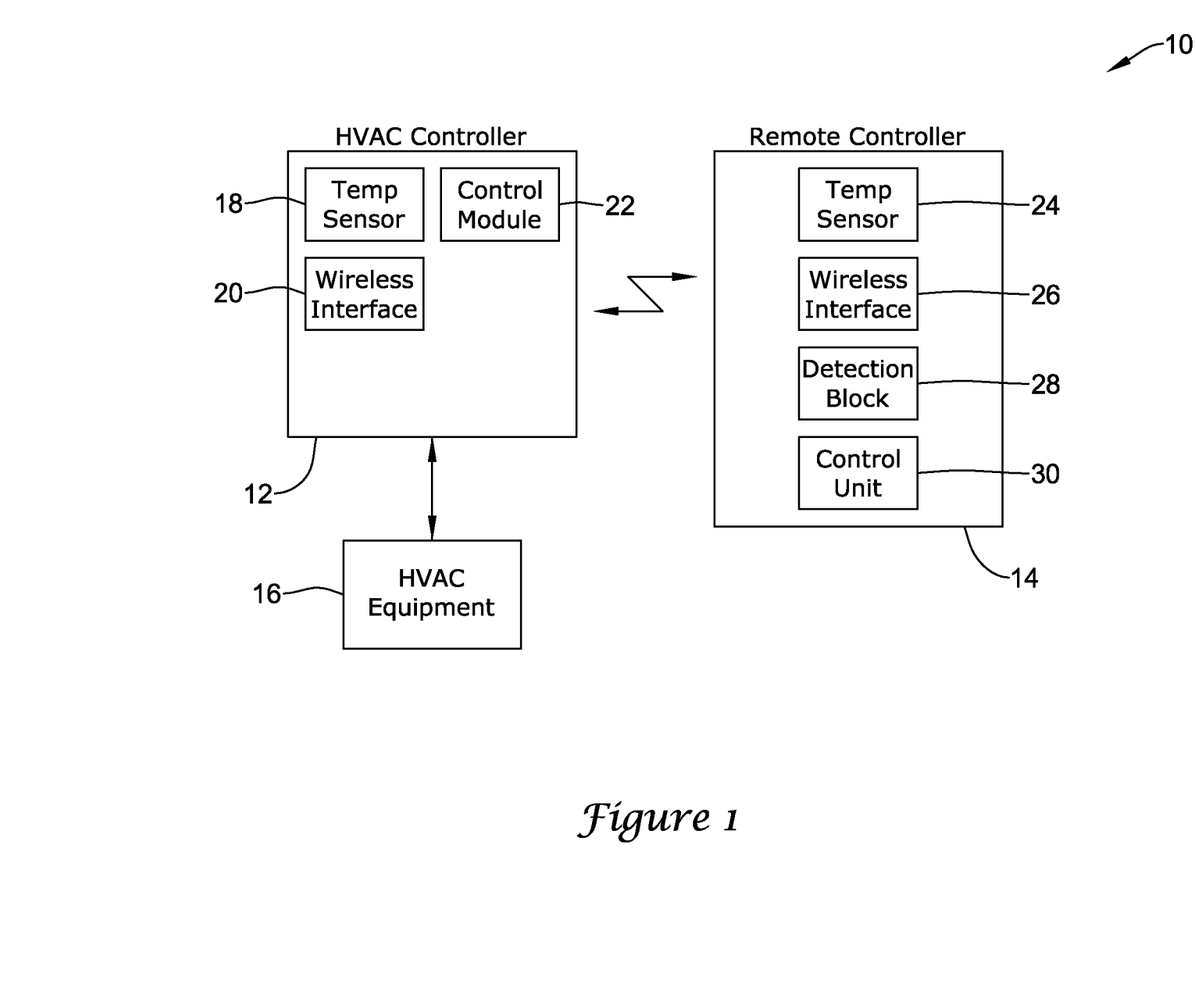
FIG. 1 is a block diagram of an illustrative HVAC control system including an HVAC controller and a portable remote control unit.

FIG. 1 is a block diagram of an illustrative HVAC control system 10. The HVAC control system 10 may sometimes be referred to as a comfort control system. In the illustrative embodiment, HVAC control system 10 may include a heating, ventilation, and air conditioning (HVAC) controller 12, HVAC equipment 16 having one or more HVAC system components, and a remote control unit 14. In the illustrative embodiment, HVAC controller 12 may be operatively connected in any suitable manner to HVAC equipment 16. HVAC equipment 16 may include one or more HVAC system components that can be activated to regulate one or more environmental conditions such as temperature, humidity, ventilation, and/or other air quality levels within a building or other structure. Example HVAC equipment 16 may include, but are not limited to, cooling units (e.g. air conditioners), heating units (e.g. boilers, furnaces, etc.), filtration units, dampers, valves, sensors, humidifier/dehumidifier units, and ventilation units (e.g. fans, blowers, etc.). In some cases, HVAC controller 12 may be a thermostat, such as, for example, a wall mountable thermostat, but this is not required in all embodiments.

In the illustrative embodiment of FIG. 1, the HVAC controller 12 may include a control module 22, a temperature sensor 18, and a wireless interface 20. Temperature sensor 18 may sense the temperature proximate to the HVAC controller 12. As illustrated, temperature sensor 18 may be included with the HVAC controller 12, such as within the housing of HVAC controller 12. However, it is contemplated that temperature sensor 18 may be located remote from the HVAC controller 12, but in communication therewith.

Control module 22 of HVAC controller 12 may be configured to control the comfort level of at least a portion of the building or structure by activating and/or deactivating one or more of the HVAC components of HVAC equipment 16. In some cases, control module 22 may be configured to control one or more HVAC functions, such as, for example, HVAC schedules, temperature setpoints, humidity setpoints, ventilation, trend logs, timers, environment sensing, and/or other HVAC functions, as desired. In the illustrative embodiment, control module 22 may selectively control the comfort level of at least a portion of the building or structure using the temperature sensed by temperature sensor 18 or a temperature sensed by a temperature sensor 24 of the remote control unit 14, as will be discussed in further detail below.

In the illustrative embodiment, wireless interface 20 may be configured to wirelessly communicate with a wireless interface 26 of the remote control unit 14. For example, wireless interface 20 may be configured to communicate with wireless interface 26 of the remote control unit 14 to send and/or receive one or more signals that correspond to, for example, the temperature sensed by the temperature sensor 24 of the remote control unit 14. In the illustrative embodiment, the wireless interface 20 may include, for example, a radio frequency (RF) wireless interface, an infrared wireless interface, a microwave wireless interface, an optical interface, and/or any other suitable wireless interface, as desired. Wireless interface 20 may be in communication with the control module 22 of the HVAC controller 12 to provide information corresponding to the temperature sensed by, for example, temperature sensor 24.

In some cases, wireless interface 20 of the HVAC controller 12 may also be configured to wirelessly communicate (e.g. transmit and/or receive signals) with one or more HVAC components of HVAC equipment 16. In other cases, a hard-wired interface may be provided between the HVAC controller 12 and one or more HVAC components of HVAC equipment 16, as desired.

As indicated above, the remote control unit 14 may be operatively connected to the HVAC controller 12 to provide remote temperature sensing for the HVAC control system 10. In some cases, the remote control unit 14 may be a portable handheld remote control unit that can easily be carried by an occupant of the building or other structure. The remote control unit 14 may be, in some cases, a portable remote sensing module for sensing an environmental parameter and providing a measure related to the sensed environmental parameter to HVAC controller 12 via the wireless interfaces 26 and 20. In other cases, the remote control unit 14 may be a more sophisticated device that includes a remote user interface (RUI) that allows a user to view, display and/or change one or more parameters or settings of the HVAC controller 12 and/or remote control unit 14, as desired. In some illustrative embodiments, remote control unit 14 may allow a user to interact with the HVAC Controller 12 from locations remote from the HVAC Controller 12 itself.

As illustrated, remote control unit 14 includes a temperature sensor 24, a wireless interface 26, a detection block 28, and a control unit 30. While a temperature sensor 24 is shown in FIG. 1, it is contemplated that the remote control unit 14 may alternatively, or in addition, have one or more other types of sensors (e.g. humidity sensors, gas sensors, etc.). As briefly mentioned previously, temperature sensor 24 may be configured to sense the ambient temperature of the environment in the vicinity of the remote control unit 14. In some cases, wireless interface 26 may be configured to wirelessly communicate (e.g. transmit and/or receive) with the wireless interface 20 of the HVAC controller 12. In the illustrative embodiment, control unit 30 of the remote control unit 14 may be configured to produce a measure that is related to the ambient temperature sensed by temperature sensor 24 and, in some cases, may cause wireless interface 26 to wirelessly communicate the measure related to the ambient temperature sensed by the temperature sensor 24 to the HVAC controller 12.

During use, the remote control unit 14 may be carried to various rooms or locations within the building or structure by the user to control the comfort level using the temperature (and/or other parameter) sensed at the current location of the remote control unit 14, instead of or in addition to using the temperature (and/or other parameter) sensed at the fixed location of the HVAC Controller 12 and/or at fixed locations of remote wall mounted sensors.

For example, in a residential home or building, the remote control unit 14 may be carried between a living room, a kitchen, a den, a bedroom, and/or any other room or location in the residential building. The temperature sensor 24 of the remote control unit 14 may sense an ambient temperature adjacent to the remote control unit 14, and the remote control unit 14 may relay a measure related to the sensed temperature to the HVAC controller 12. The control module 22 of the HVAC controller 12 may use the measure related to the temperature sensed by the remote control unit 14 to help control the comfort level at the location of the remote control unit within the building or other structure.

In one illustrative embodiment, the remote control unit 14 may be configured to be portable and thus held by a user from time to time. This can result in the temperature sensor 24 registering an elevated sensed temperature caused by, for example, heat transfer from the user's hand to the remote control unit 14. Likewise, remote control unit 14 may be placed at locations where the sensed temperature may not accurately reflect the ambient temperature of the room. For example, the remote control unit 14 may not register an accurate temperature when the remote control unit 14 is placed in bright sunlight, near an open window or door, near a heat source, or placed at another location where the conditions cause the sensed temperature to be inaccurate. Likewise, the remote control unit 14 may be moved by the user to a location outside of the building or structure. In these and other situations, the HVAC system 10 may operate using an inaccurate temperature reading, and may cause the HVAC system 10 to consume excess energy and/or may cause at least a portion of the building or structure to have relatively extreme high or low temperatures. Similar situations can arise for parameters such as humidity, particularly when the remote control unit 14 includes a sensor for sensing such parameters.

In the illustrative embodiment of FIG. 1, detection block 28 may be configured to detect when the ambient temperature sensed by temperature sensor 24 of the remote control unit 14 is likely to be influenced by a user or other condition. For example, detection block 28 may be configured to detect when a user is likely holding the remote control unit 14, when a user is interacting with a user interface of the remote control unit 14, when a user is moving the remote control unit 14, when the remote control unit 14 has an unacceptable attitude, when the remote control unit 14 has an unacceptable orientation, and/or when the remote control unit 14 might otherwise be registering a temperature that is inaccurate. In some cases, detection block 28 may be provided as part of the control unit 30, control unit 30 may be provided as part of the detector block 28, or control unit 30 and detection block 28 may be provided separately, as desired.

In operation, and in one illustrative embodiment, when the detection block 28 detects that the ambient temperature sensed by the temperature sensor 24 is likely to be influenced by a user or other condition, control unit 30 and/or detection block 28 of the remote control unit 14 may, for example: cause the wireless interface 26 to wirelessly communicate the measure related to the ambient temperature sensed by temperature sensor 24 to the comfort control system (e.g. HVAC controller 12 of FIG. 1) less often than when no such influence is detected; cause the wireless interface 26 to suspend wirelessly communication of the measure related to the ambient temperature sensed by the temperature sensor 24 to the comfort control system (e.g. HVAC controller 12 of FIG. 1); cause the wireless interface 26 to wirelessly communicate a signal to the comfort control system (e.g. HVAC controller 12 of FIG. 1) that indicates that the ambient temperature sensed by the temperature sensor 24 is likely to be influenced by a user or other condition; and/or otherwise attempt to mitigate and/or communicate the influence.

In some cases, the control unit 30 and/or detection block 28 may slow the ambient temperature response of the temperature sensor 24 when an influence is detected. In the example case of slowing the temperature response, or suspending wireless communication between wireless interface 26 and wireless interface 20, the control module 22 of the HVAC controller 12 may operate according to the last known good ambient temperature communicated by the remoter control unit 14 or, in other cases, may operate using the temperature sensed by temperature sensor 18 of the HVAC controller 12, as desired.

As discussed above, and in some cases, a signal may be transmitted from the remote control unit 14 to the HVAC controller 12 that indicates that the ambient temperature sensed by the temperature sensor 24 is likely influenced by a user or other condition. This signal may include a compensation value that may be used to adjust the detected ambient temperature, or may include an appropriate command for the control module 22 of the HVAC controller 12 to adjust the temperature used by control module 22 when controlling the comfort level of the space, as will be discussed in further detail below.

It should be recognized that HVAC controller 12 and remote control unit 14 of FIG. 1 are merely illustrative and are not meant to be limiting in any manner. It is to be understood that the HVAC controller 12 and the remote control unit 14 may take on any suitable form, as desired.

In some cases, it is contemplated that the HVAC controller 12 may include a user interface that may allow a user to program and/or modify one or more control parameters of remote control unit 12 and/or HVAC controller 12, such as programming, setpoints and/or schedule parameters, as desired. When so provided, the user interface may include a touch screen, a liquid crystal display (LCD) panel and keypad, a dot matrix display, buttons and/or any other suitable interface, as desired. Likewise, remote control unit 14 may include a user interface that may allow a user to program and/or modify one or more control parameters of remote control unit 12 and/or HVAC controller 12, such as programming, setpoints and/or schedule parameters, as desired. In some embodiments, parameters of the HVAC controller 12 may be received via a user interface of remote control unit 14, which are then transmitted to the HVAC controller 12 via wireless interface 26 and wireless interface 20 for use by the HVAC controller 12.

Figure 2:
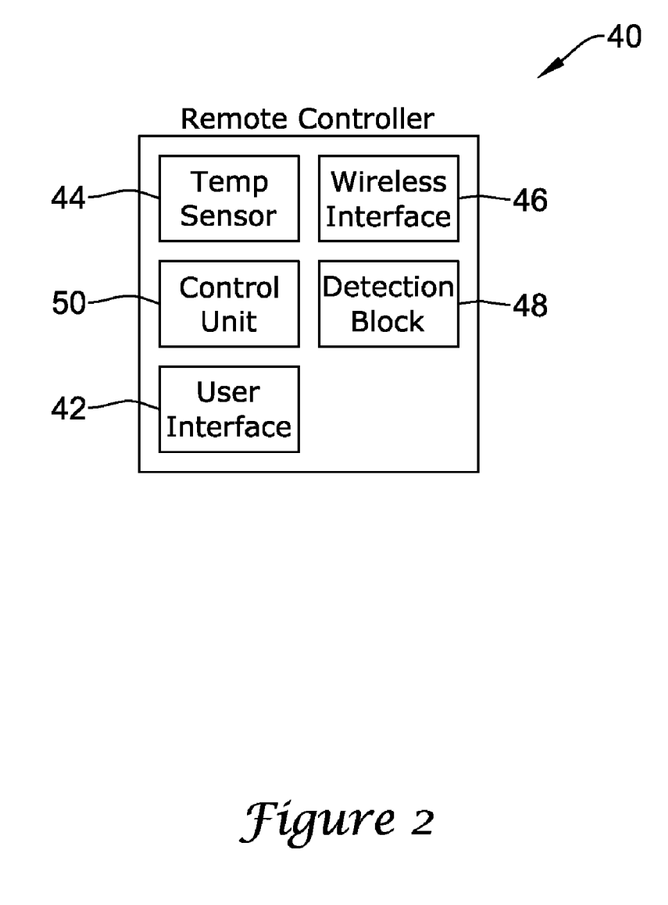
FIG. 2 is a block diagram of another illustrative a remote control unit.

FIG. 2 is a block diagram of another illustrative a remote control unit for use in a comfort control system. In the illustrative embodiment of FIG. 2, remote control unit 40 includes a temperature sensor 44, a wireless interface 46, a detection block 48, and a control unit 50, similar to those described above. The remote control unit 40 may also include a user interface 42 that may allow a user to program and/or modify one or more control parameters of remote control unit 40 and/or HVAC controller 12, such as programming and/or schedule parameters, as desired. In one illustrative embodiment, some or all of these parameters may be received via a user interface 42 of remote control unit 40, and then transmitted to the HVAC controller (shown as 12 in FIG. 1) via wireless interface 46. In some cases, the user interface 42 may include a touch screen, a liquid crystal display (LCD) panel and keypad, a dot matrix display, one or more buttons and/or any other suitable interface, as desired.

In the illustrative embodiment, detection block 48 may be configured to monitor the user interface 42 for user interaction. For example, detection block 48 may be configured to monitor user interface 42 for keypad presses, button presses, touch screen touches, or any other user interaction, as desired. When detection block 48 detects user interaction with remote control unit 40, detection block 48 may determine that the ambient temperature sensed by the temperature sensor 44 is likely to be influenced by the user. In some cases, detection block 48 may include software to monitor the user interface 42, but this is not required. Rather, it is contemplated that any suitable manner of detecting user interaction with user interface 42 may be used, as desired.

In some cases, when detection block 48 detects user interaction with user interface 42, control unit 50 of remote control unit 40 may be configured to slow the reported temperature response to compensate for the heat added to the remote control unit 40 by the user, such as, for example, by the user's hand. The temperature response may be slowed by, for example, reporting temperature changes that are smaller than the sensed temperature changes for a period of time, reporting an average or moving average of the sensed temperature changes, or otherwise slowing the temperature response that is reported by the remote control unit 40. In other cases, control unit 50 of the remote control unit 40 may temporarily suspend reporting the sensed temperature to the comfort control system, terminate wireless communication with the comfort control system requiring a user to manually restart communication, report the ambient temperature sensed by temperature sensor 44 to the comfort control system less often, and/or otherwise mitigate the anticipated influence of the user on the sensed temperature.

Figure 3:
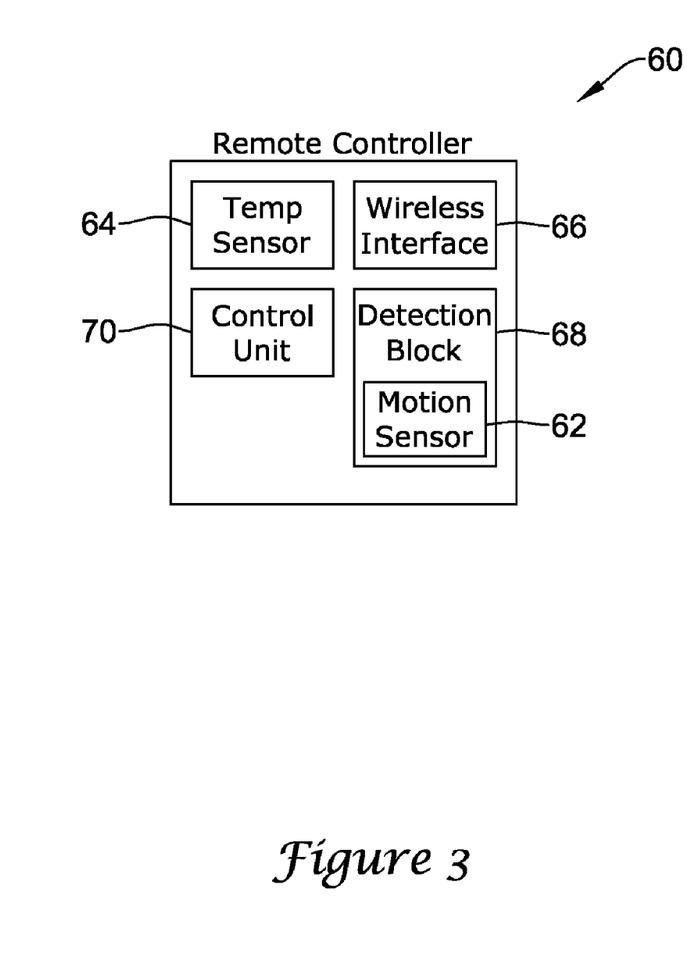
FIG. 3 is a block diagram of an illustrative remote control unit having a motion sensor.

FIG. 3 is a block diagram of an illustrative remote control unit having a motion sensor. In the illustrative embodiment, remote control unit 60 includes a temperature sensor 64, a wireless interface 66, a detection block 68, a control unit 70, and a motion sensor 62. The motion sensor 62 is configured to sense motion of the remote control unit 60. In some cases, the motion sensor 62 may be a roller ball switch, an accelerometer, a gyroscope, or any other suitable motion sensor, as desired. As illustrated, motion sensor 62 may be provided as part of detection block 68, but this is not required.

In the illustrative embodiment, detection block 68 may be configured to detect that the ambient temperature sensed by the temperature sensor 64 is likely to be influenced by the user when the motion sensor 62 detects motion of the remote control unit 60. For example, when the user is holding the remote control unit 60, walking with the remote control unit 60, or otherwise moving remote control unit 60, motion sensor 62 may detect motion of the remote control unit 60. Motion sensor 62 may be part of or coupled to detection block 68 and may indicate when there is motion.

In some cases, detection block 68 may be configured to determine if a motion sensed by motion sensor 62 is caused by a user or the surrounding environment of the building or structure. For example, detection block 68 may be configured to include a filter to filter out high frequency vibrations sensed by motion sensor 62. Example high frequency vibrations that may be filtered out may include, but is not limited to, high frequency vibrations associated with an airplane flying over the building or structure or high frequency vibrations associated with a vehicle, such as semi-trucks, driving past the building or structure. Furthermore, it is contemplated that detection block 68 may be configured to filter out any frequency of vibrations or other movements, as desired.

In some cases, when detection block 68 detects motion of the remote controller 40 via motion sensor 62, control unit 70 may be configured to slow the reported temperature response to compensate for the anticipate heat added to the remote control unit 60 by the user, such as, for example, by the user's hand. In other cases, control unit 70 of the remote control unit 60 may temporarily suspend reporting the sensed temperature to the comfort control system for a period of time, terminate wireless communication with the comfort control system requiring a user to manually restart communication of the sensed temperature, report the ambient temperature sensed by temperature sensor 64 to the comfort control system less often, and/or otherwise mitigate the anticipated influence of the user on the sensed temperature of the remote control unit 60.

Figure 4:
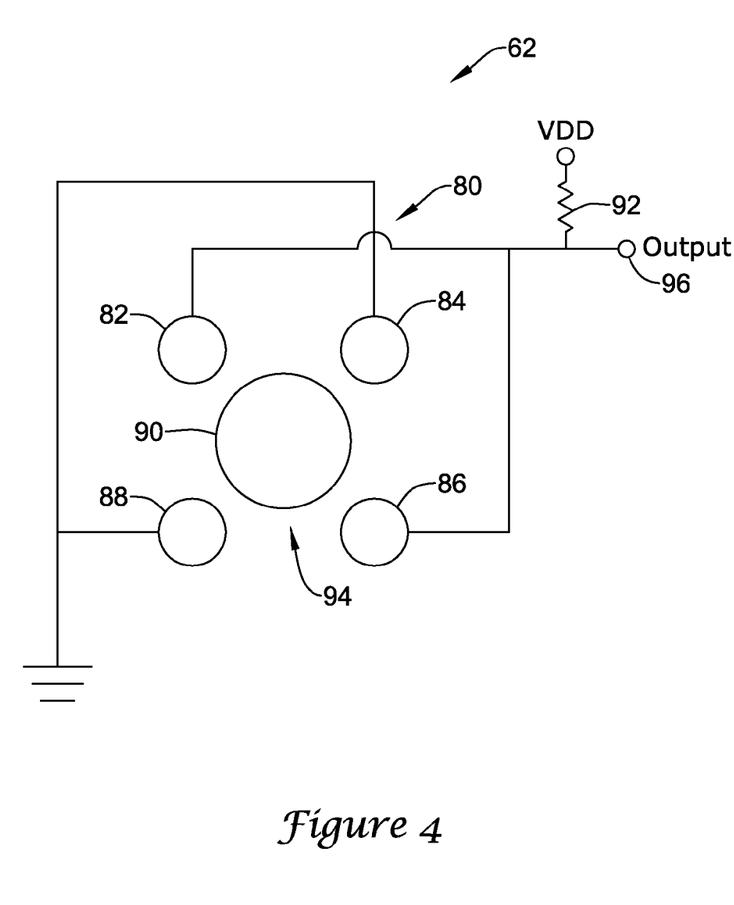
FIG. 4 is a schematic diagram of an illustrative motion sensor of the remote control unit of FIG. 3.

FIG. 4 is a schematic diagram of an illustrative motion sensor 62 of the remote control unit 60 of FIG. 3. In the illustrative example, the motion sensor 62 includes a roller ball switch 80. As illustrated, the roller ball switch 80 may include a plurality of metal contacts 82, 84, 86, and 88 surrounding a metal ball 90. The metal contacts 82, 84, 86, and 88 may be positioned to define a perimeter of a chamber 94 for housing the metal ball 90. In the illustrative embodiment, metal contacts 82, 84, 86, and 88 and metal ball 90 may include an electrically conductive materials such as metal.

In some cases, the chamber 94 may include one or more non-conductive caps (not shown) defining a top surface of the chamber 94 and/or a bottom surface of the chamber 94. In some cases, the one or more non-conductive caps may be contoured to define, in part, an angle at which the remote control unit 60 must be rotated before the metal ball 90 moves between contacts 82, 84, 86, and 88. For example, the caps may extend at an angle from metal contacts 86 and 88 to metal contacts 82 and 84 to coincide, at least in part, an angled rest position of the remote control unit 60.

In the illustrative roller ball switch 80 circuit, metal contacts 82 and 86 may be electrically connected in parallel to a voltage source $V_{DD}$. A resistor 92 may be provided in series with voltage source $V_{DD}$. As illustrated, metal contacts 82 and 86 are electrically connected to $V_{DD}$ are separated by metal contacts 84 and 88, which are electrically connected to ground. As illustrated, metal contacts 82, 84, 86, and 88 may be spaced such that the metal ball 90 can not pass between adjacent contacts 82, 84, 86, and 88. Also, metal contacts 82, 84, 86, and 88 may be spaced such that metal ball 90 may contact two adjacent metal contacts 82, 84, 86, and 88 at a time, but not three or more. In this arrangement, when metal ball 90 contacts two adjacent metal contacts 82, 84, 86, and 88, the metal ball 90 may produce a complete circuit in the roller ball switch 80. In other words, metal ball 90 may connect voltage source $V_{DD}$ to ground, thereby resulting in a voltage drop across resistor 92.

In operation, when the remote control unit 60 is moved by the user, the metal ball 90 may roll around the chamber 94 making and breaking contact with metal contacts 82, 84, 86, and 88. An output 96 of the switch 80 may be coupled to the detection block 68 to provide a signal corresponding to the state of the switch 80. The output 96 may provide a first signal when a completed circuit is present and a second signal when a completed circuit is not present. Using output 96, detection block 68 may detect movement of the remote control unit 60 indicated by signal changes at output 96. For example, if output 96 changes state, detection block may determine that the remote control unit 60 is being moved.

Figure 5:
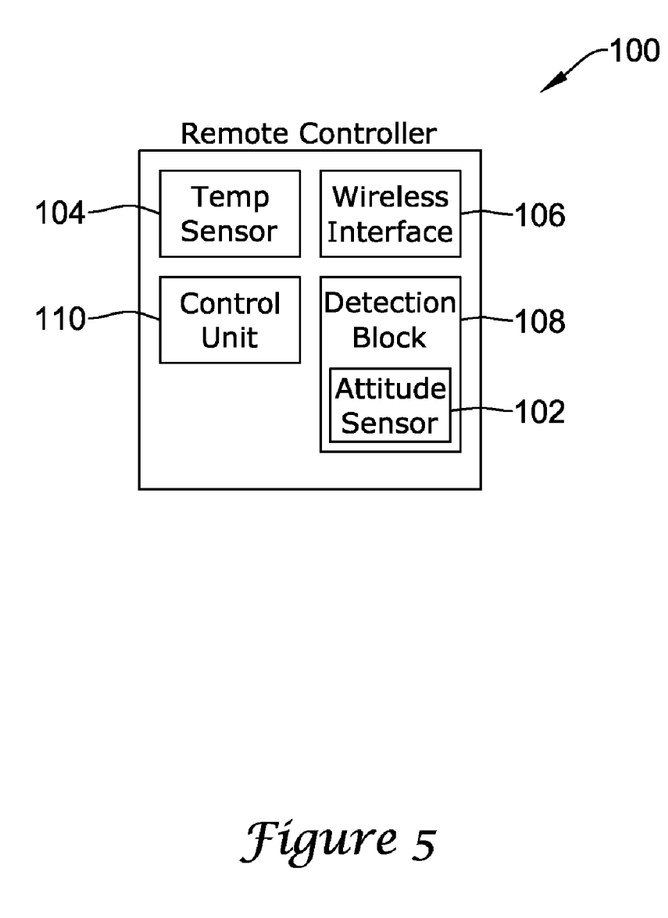
FIG. 5 is a block diagram of an illustrative remote control unit having an attitude sensor.

FIG. 5 is a block diagram of an illustrative remote control unit 100 having an attitude sensor. In the illustrative embodiment shown, remote control unit 100 includes a temperature sensor 104, a wireless interface 106, a detection block 108, a control unit 110 and an attitude sensor 102. The attitude sensor 102 may be used to sense the attitude (e.g. orientation) of the remote control unit 100. In some cases, the attitude sensor 102 may be a tilt sensor, a pendulum switch, a base switch, a spring actuated foot or button, an accelerometer, a gyroscope, or any other suitable attitude sensor, as desired. As illustrated, attitude sensor 102 may be provided as part of detection block 108, but this is not required.

In some illustrative embodiments, detection block 108 may be configured to detect that the ambient temperature sensed by the temperature sensor 104 is likely to be influenced by the user when the attitude sensor 102 detects that the attitude of the remote control unit 100 is unacceptable. In operation, and in one illustrative embodiment, when the detection block 108 detects that the ambient temperature sensed by the temperature sensor 104 is likely to be influenced by a user, control unit 110 and/or detection block 108 of the remote control unit 100 may, for example: cause the wireless interface 106 to wirelessly communicate the measure related to the ambient temperature sensed by temperature sensor 104 to the comfort control system (e.g. HVAC controller 12 of FIG. 1) less often than when no such influence is detected; cause the wireless interface 106 to suspend wirelessly communication of the measure related to the ambient temperature sensed by the temperature sensor 104 to the comfort control system (e.g. HVAC controller 12 of FIG. 1); cause the wireless interface 106 to wirelessly communicate a signal to the comfort control system (e.g. HVAC controller 12 of FIG. 1) that indicates that the ambient temperature sensed by the temperature sensor 104 is likely to be influenced by a user; and/or otherwise attempt to mitigate and/or communicate the influence.

In some embodiments, remote control unit 100 may include an alert to alert the user when the detection block 108 detects that the ambient temperature sensed by the temperature sensor 104 is likely to be influenced by the user, and/or when the comfort control system (e.g. HVAC controller 12 of FIG. 1) is no longer controlling based upon the temperature sensed at the remote control unit 100. In some cases, the alert may alert the user that the remote control unit 100 is positioned in an unacceptable attitude. In some cases, the alert may be an audible alert, such as a beep or siren, or could be a flashing alert, such as a flashing background on a display or other visual indicator. These are just some example alerts, but it is contemplated that any other suitable alert may be used, if such an alert is desired. Furthermore, it is contemplated that an alert may be incorporated into any suitable embodiment disclosed herein alerting the user of user influence or unacceptable orientation or attitude, as desired.

When the attitude sensor 102 includes a switch, either the base switch or spring actuated foot or button, the attitude sensor 102 may include a switch at the base of the remote control unit 100 configured to enable comfort control using the temperature sensed by the remote control unit 100 when the switch is, for example closed, and disable or otherwise limit comfort control using the temperature sensed by the remote control unit 100 when the switch is, for example open. In one example, a spring actuate switch may include a switch mounted to a printed circuit board of remote control unit 100. A biasing member, such as a spring, may be provided to bias the switch to an open position. The spring may be coupled to a foot or button of the remote control unit 100, which may be configured to act as a stand or base of the remote control unit 100. When placed in the proper position, the weight of the remote control unit 100 may exert a force upon the foot or button overcoming the bias force of the spring, thereby causing the switch to close. In some cases, wireless communication of the wireless interface 106 may be suspended when the switch is open and reinitiated when the switch is closed. In some situations, the remote control unit 100 may be configured to terminate comfort control based on the temperature sensed by the remote control unit 100 if the switch remains open for a period of time, and may require user intervention to reinitiate comfort control based on the temperature sensed by the remote control unit 100.

When the attitude sensor 102 includes a tilt sensor, the tilt sensor may detect the attitude (e.g. orientation) of the remote control unit 100. The detection block 108 may be configured to enable comfort control using the temperature sensed by the remote control unit 100 when the attitude of the remote control unit 100 is acceptable (e.g. in a vertical orientation), and disable or otherwise limit comfort control using the temperature sensed by the remote control unit 100 when the attitude is unacceptable (e.g. horizontal orientation). In some cases, the tilt sensor may be mounted to a printed circuit board of the remote control unit 100 and may include one or more outputs. As the tilt sensor is moved, at least one of the one or more outputs of the tilt sensor may change, such as, for example, changing a voltage and/or current at the output of the tilt sensor. In some cases, the one or more outputs of the tilt sensor may be coupled to the detection block 108. Suitable available tilt sensors may include, but are not limited to, Micro Tilt Sensor D6B available from Omron® of Schaumburg, Ill., or tilt sensor GP1S036HEZ available from SHARP Corporation®. It is contemplated, however, that any other suitable tilt sensor may be used, as desired.

Figure 6:
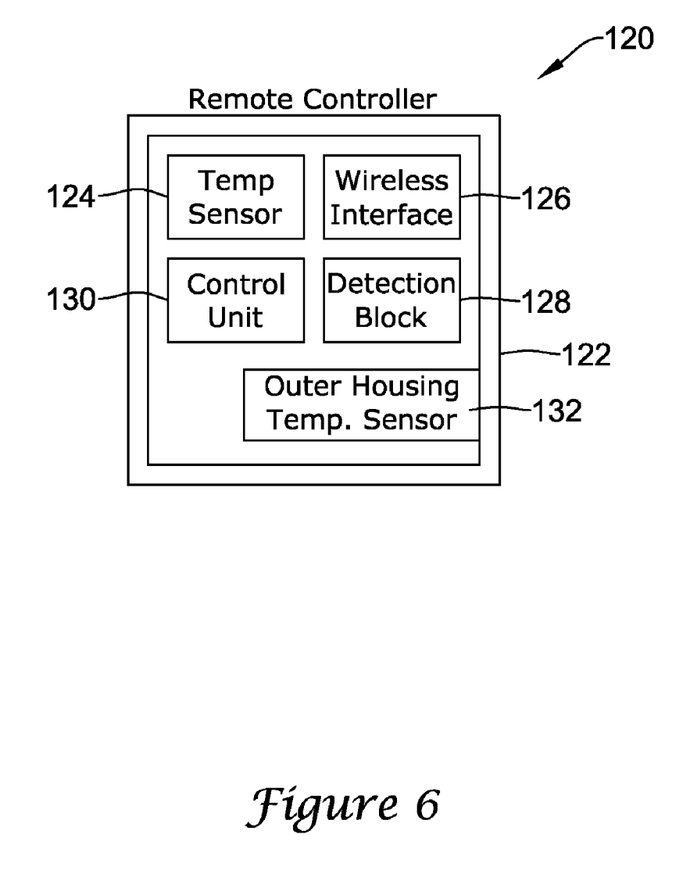
FIG. 6 is a block diagram of another illustrative remote control unit having an ambient temperature sensor and an outer housing temperature sensor.

FIG. 6 is a block diagram of another illustrative remote control unit 120. In the illustrative embodiment, remote control unit 120 may include an ambient air temperature sensor 124, a wireless interface 126, a detection block 128, a control unit 130, and an outer housing temperature sensor 132. The ambient air temperature sensor 124 of FIG. 6 may be similar to the temperature sensors 24, 44, 64, and 104 discussed above, which may also be considered ambient air temperature sensors. In the illustrative embodiment, the outer housing temperature sensor 132 may be more thermally coupled to an outer housing 122 of the remote control unit 120 than the ambient temperature sensor 124. In this configuration, the outer housing temperature sensor 132 may respond more quickly to heat applied to the outer housing of the remote control unit 120 from, for example, the user's hand or other heat source, than the ambient air temperature sensor 124. In other cases, the outer housing temperature sensor 132 may be coupled to a thermal mass, which may be the outer housing 122, batteries, weights, or any other suitable thermal mass, as desired. In any case, the outer housing temperature sensor 132 may be configured to detect and/or sense thermal conduction from a user more quickly than ambient temperature sensor 124. In some cases, outer housing temperature sensor 132 may be provided as part of detection block 128, but this is not required.

In one illustrative example, the outer housing temperature sensor 132 may be physically coupled to or in close proximity to the outer housing 122, and ambient air temperature sensor 124 may be physically isolated from the outer housing 122. In some cases, a vent (not shown) may be provided in the outer housing 122, and ambient temperature sensor 124 may be positioned adjacent or otherwise in fluid communication with the vent. When so provided, the pre-dominate heat transfer to the ambient temperature sensor 124 may be through air convection through the vent in the outer housing 122, while the pre-dominate heat transfer to the outer housing temperature sensor 132 may be through the outer housing 122 itself via conduction. In other words, ambient air temperature sensor 124 may be more sensitive to temperature changes in the ambient air temperature than the outer housing temperature sensor 132, and the outer housing temperature sensor 132 may be more sensitive to temperature changes in the outer housing than the ambient air temperature sensor 124.

As such, ambient air temperature sensor 124 may change more rapidly than outer housing temperature sensor 132 when the ambient air temperature changes and, conversely, outer housing temperature sensor 132 may change more rapidly than ambient air temperature sensor 124 in response to temperature changes of the outer housing, which are often caused by the user or other undesirable condition. In some cases, the detection block 128 may compare the temperatures sensed by ambient air temperature sensor 124 and outer housing temperature sensor 132. If the change in the outer housing temperature sensor 132 is greater than the change in ambient air temperature sensor 124 by some threshold or other amount, then detection block 128 may determine that it is likely that a user or other condition is influencing the ambient air temperature sensed.

In some cases, control unit 130 of the remote control unit 120 may be configured to produce a measure that is related to the ambient air temperature sensed by the ambient air temperature sensor 124, and may cause the wireless interface 126 to wirelessly communicate the measure related to the sensed ambient air temperature to a comfort control system (e.g. HVAC controller 12 of FIG. 1). The detection block 128 may be configured to compensate or otherwise adjust the measure that is related to the ambient air temperature sensed by the ambient air temperature sensor 124 based upon the temperature sensed by the outer housing temperature sensor 132.

For example, and in some cases, the detection block 128 and/or control unit 130 may compensate or adjust the measure that is related to the ambient air temperature sensed by the ambient air temperature sensor 124 by arithmetically combining the ambient air temperature sensed by the ambient air temperature sensor 124 and the temperature sensed by the outer housing temperature sensor 132. That is, and in one example, the detection block 128 and/or control unit 130 may subtract an amount from the ambient air temperature sensed by the ambient air temperature sensor 124, where the amount is dependent upon the difference between the ambient air temperature sensed by the ambient air temperature sensor 124 and the temperature sensed by the outer housing temperature sensor 132. This is just one example. In some cases, one or more compensation parameters may be compiled and stored, sometimes in a look-up table. Then, the detection block 128 and/or control unit 130 may use the compensation parameters to compensate or adjust the measure that is related to the ambient air temperature sensed by the ambient air temperature sensor 124 before providing the measure to the comfort control system (e.g. HVAC controller 12 of FIG. 1). In other cases, both the ambient air temperature sensed by the ambient air temperature sensor 124 and the temperature sensed by the outer housing temperature sensor 132 may be provided to the comfort control system (e.g. HVAC controller 12 of FIG. 1), and the comfort control system may perform some form of compensation, if desired.

In other cases, the detection block 128 and/or control unit 130 may adjust the measure that is related to the ambient air temperature sensed by the ambient air temperature sensor 124 by logically combining the ambient air temperature sensed by the ambient air temperature sensor 124 and the temperature sensed by the outer housing temperature sensor 132. In still other cases, the detection block 128 and/or control unit 130 may adjust the measure that is related to the ambient air temperature sensed by the ambient air temperature sensor 124 by temporally combining the ambient air temperature sensed by the ambient air temperature sensor 124 and the temperature sensed by the outer housing temperature sensor 132. In some cases, the detection block 128 and/or control unit 130 may have a limit on the adjustment of the measure that is related to the ambient air temperature sensed by the ambient air temperature sensor 124. The limit may be placed only in a direction that corresponds to a direction of change in the temperature sensed by the outer housing temperature sensor 132, if desired.

Figure 7:
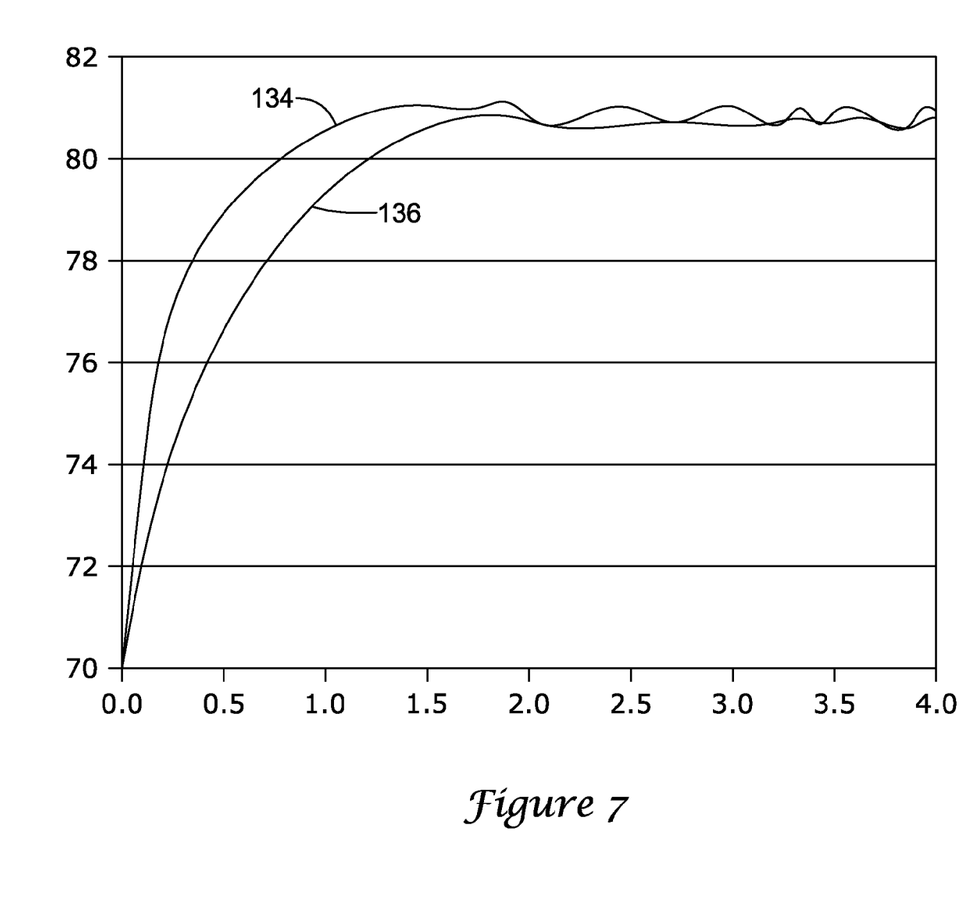
FIGS. 7 and 8 are graphs of an illustrative temperature response of the temperature sensors of FIG. 6.
Figure 8:
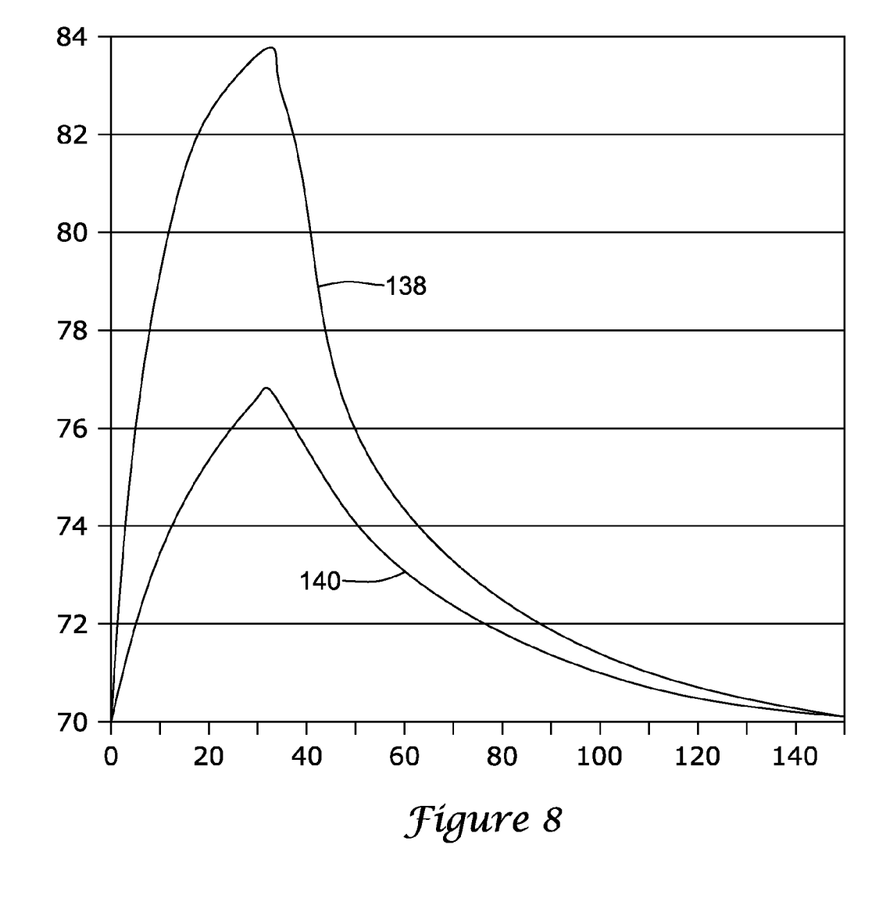

FIGS. 7 and 8 are graphs of an illustrative temperature response of the ambient air temperature sensor 124 and the outer housing temperature sensor 132 of FIG. 6. More specifically, FIG. 7 shows the response time of ambient air temperature sensor 124, shown as line 134, and outer housing temperature sensor 132, shown as line 136, when the ambient temperature changes by ten degrees Fahrenheit. As can be seen, line 134 has a quicker response time than line 136. As such, ambient air temperature sensor 124 responds relatively quicker than outer housing temperature sensor 132 under these conditions.

FIG. 8 shows an illustrative response time of ambient air temperature sensor 124, shown as line 140, and outer housing temperature sensor 132, shown as line 138, when exposed to heat from a user, such as, for example, from a user's hand. In this case, line 138 has a quicker response time to the temperature than line 140. As such, outer housing temperature sensor 132 responds quicker than ambient air temperature sensor 124 under these conditions. Based on these differences, the detection block 128 and/or control unit 130 of the remote control unit 120, and/or the comfort control system (e.g. HVAC controller 12 of FIG. 1), may limit the use of the ambient air temperature sensed by the ambient air temperature sensor 124 and/or provide compensation to the ambient air temperature sensed by the ambient air temperature sensor 124 when, for example, external heat is applied to the housing of the remote control unit 120.

While the foregoing invention has been described primarily with reference to building control systems, it is not meant to be limiting. It is to be understood that the present invention may be incorporated into any controller, such as, remote controls for building components, fireplaces, and/or any other suitable environmental control device, as desired.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respect, only illustrative. Changes may be made in details, particularly in matters of shape, size, and arrangement of parts without exceeding the scope of the invention. The invention's scope is, of course, defined in the language in which the appended claims are expressed.

The invention claimed is:

1. A remote control unit for use with a comfort control system of a building or other structure, wherein the remote control unit is configured to be carried around the building or other structure by a user and to report out one or more sensed ambient conditions to the comfort control system, the remote control unit comprising:

a housing;

a temperature sensor situated in the housing for sensing a current sensed ambient temperature at the remote control unit;

a wireless interface for wirelessly communicating a measure related to the current sensed ambient temperature sensed by the temperature sensor to the comfort control system; and a detection block for detecting when the current sensed ambient temperature sensed by the temperature sensor may be influenced by a thermal source located outside of the housing of the remote control unit, wherein the thermal source is separate from the comfort control system of the building or other structure.

2. The remote control unit of claim 1 further comprising:

a control unit for producing the measure that is related to the current sensed ambient temperature sensed by the temperature sensor, and for causing the wireless interface to wirelessly communicate the measure related to the current sensed ambient temperature sensed by the temperature sensor to the comfort control system.

3. The remote control unit of claim 2 wherein the control unit causes the wireless interface to wirelessly communicate the measure related to the current sensed ambient temperature sensed by the temperature sensor to the comfort control system less often when the detection block detects that the current sensed ambient temperature sensed by the temperature sensor may be influenced by a thermal source located outside of the housing of the remote control unit.

4. The remote control unit of claim 2 wherein the control unit causes the wireless interface to suspend wirelessly communicating the measure related to the current sensed ambient temperature sensed by the temperature sensor to the comfort control system when the detection block detects that the current sensed ambient temperature sensed by the temperature sensor may be influenced by a thermal source located outside of the housing of the remote control unit.

5. The remote control unit of claim 2 wherein the control unit causes the wireless interface to wirelessly communicate a signal to the comfort control system that indicates that the detection block detects that the current sensed ambient temperature sensed by the temperature sensor may be influenced by a thermal source located outside of the housing of the remote control unit.

6. The remote control unit of claim 2 wherein the control unit is part of the detection block.

7. The remote control unit of claim 2 wherein the control unit is separate from the detection block.

8. The remote control unit of claim 1 further comprising:
a user interface; and
wherein the detection block detects that the current sensed ambient temperature sensed by the temperature sensor likely to be influenced by a thermal source located outside of the housing when a user is detected interacting with the user interface.

9. The remote control unit of claim 8 wherein the user interface includes one or more buttons, and wherein the detection block detects that the current sensed ambient temperature sensed by the temperature sensor may be influenced by a thermal source located outside of the housing when a user is detected interacting with one or more of the buttons.

10. The remote control unit of claim 1 wherein the detection block includes a motion sensor, and wherein the detection block detects that the current sensed ambient temperature sensed by the temperature sensor may be influenced by a thermal source located outside of the housing when the motion sensor detects motion of the remote control unit.

11. The remote control unit of claim 10 wherein the motion sensor is a roller ball switch.

12. The remote control unit of claim 10 wherein the motion sensor is an accelerometer.

13. The remote control unit of claim 10 wherein the detection block is configured to filter out high frequency vibrations detected by the motion sensor.

14. The remote control unit of claim 1 wherein the detection block includes a attitude sensor, and wherein the detection block detects that the current sensed ambient temperature sensed by the temperature sensor may be influenced by a thermal source located outside of the housing when the attitude sensor detects an attitude of the remote control unit that corresponds to a predefined attitude condition.

15. The remote control unit of claim 14 wherein the attitude sensor is a tilt sensor.

16. The remote control unit of claim 14 wherein the attitude sensor is a base switch.

17. The remote control unit of claim 16 wherein the base switch is a spring actuated foot.

18. The remote control unit of claim 14 further comprising:
a control unit for producing the measure that is related to the current sensed ambient temperature sensed by the temperature sensor, and for causing the wireless interface to wirelessly communicate the measure related to the current sensed ambient temperature sensed by the temperature sensor to the comfort control system; and
wherein the control unit causes the wireless interface to wirelessly communicate the measure related to the current sensed ambient temperature sensed by the temperature sensor to the comfort control system less often when the attitude sensor detects an attitude of the remote control unit that corresponds to the predefined attitude condition.

19. The remote control unit of claim 14 further comprising:
a control unit for producing the measure that is related to the current sensed ambient temperature sensed by the temperature sensor, and for causing the wireless interface to wirelessly communicate the measure related to the current sensed ambient temperature sensed by the temperature sensor to the comfort control system; and
wherein the control unit causes the wireless interface to suspend wirelessly communicating the measure related to the current sensed ambient temperature sensed by the temperature sensor to the comfort control system when the attitude sensor detects an attitude of the remote control unit that corresponds to the predefined attitude condition.

20. The remote control unit of claim 14 further comprising:
a control unit for producing the measure that is related to the current sensed ambient temperature sensed by the temperature sensor, and for causing the wireless interface to wirelessly communicate the measure related to the current sensed ambient temperature sensed by the temperature sensor to the comfort control system; and
wherein the control unit causes the wireless interface to wirelessly communicate a signal to the comfort control system that indicates the detection of the predefined attitude condition.

21. The remote control unit of claim 1 further comprising an outer housing, wherein the detection block includes an outer housing temperature sensor that is more thermally coupled to the outer housing than the temperature sensor that is for sensing the current sensed ambient temperature at the remote control unit.

22. The remote control unit of claim 21 further comprising a control unit for producing the measure that is related to the current sensed ambient temperature sensed by the temperature sensor, and for causing the wireless interface to wirelessly communicate the measure related to the current sensed ambient temperature sensed by the temperature sensor to the comfort control system.

23. The remote control unit of claim 22 wherein the measure that is related to the current sensed ambient temperature sensed by the temperature sensor produced by the control unit is also related to a temperature sensed by the outer housing temperature sensor.

24. The remote control unit of claim 23 wherein the control unit produces the measure that is related to the current sensed ambient temperature sensed by the temperature sensor by arithmetically combining the current sensed ambient temperature sensed by the temperature sensor and the temperature sensed by the outer housing temperature sensor.

25. The remote control unit of claim 23 wherein the control unit produces the measure that is related to the current sensed ambient temperature sensed by the temperature sensor by logically combining the current sensed ambient temperature sensed by the temperature sensor and the temperature sensed by the outer housing temperature sensor.

26. The remote control unit of claim 23 wherein the control unit produces the measure that is related to the current sensed ambient temperature sensed by the temperature sensor by temporally combining the current sensed ambient temperature sensed by the temperature sensor and the temperature sensed by the outer housing temperature sensor.

27. The remote control unit of claim 23 wherein the control unit limits a change in the measure that is related to the current sensed ambient temperature sensed by the temperature sensor in a direction that corresponds to a direction of change in the temperature sensed by the outer housing temperature sensor.

28. A remote control unit for use with a comfort control system of a building or other structure, the remote control unit comprising:

a temperature sensor for sensing an ambient temperature at the remote control unit;

a wireless interface for wirelessly communicating a measure related to the ambient temperature sensed by the temperature sensor to the comfort control system;

an attitude sensor for detecting an attitude of the remote control unit;

a control unit for producing the measure that is related to the ambient temperature sensed by the temperature sensor, and for causing the wireless interface to wirelessly communicate the measure related to the ambient temperature sensed by the temperature sensor to the comfort control system; and wherein the control unit causes the wireless interface to suspend wirelessly communicating the measure related to the ambient temperature sensed by the temperature sensor to the comfort control system when the attitude sensor detects an attitude of the remote control unit that corresponds to one or more predefined attitude conditions.

* * * * *